United States Patent
Yokoyama

(10) Patent No.: US 9,671,674 B2
(45) Date of Patent: Jun. 6, 2017

(54) STOP MECHANISM, LENS APPARATUS USING THE SAME, AND IMAGE PICKUP APPARATUS

(71) Applicant: CANON KABUSHIKI KAISHA, Tokyo (JP)

(72) Inventor: Akira Yokoyama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/947,102

(22) Filed: Nov. 20, 2015

(65) Prior Publication Data

US 2016/0161829 A1 Jun. 9, 2016

(30) Foreign Application Priority Data

Dec. 8, 2014 (JP) .................. 2014-247896

(51) Int. Cl.
*G03B 9/06* (2006.01)
*G02B 5/00* (2006.01)
*G03B 17/12* (2006.01)

(52) U.S. Cl.
CPC ............... *G03B 9/06* (2013.01); *G02B 5/005* (2013.01); *G03B 17/12* (2013.01)

(58) Field of Classification Search
CPC .......... G03B 9/06; G03B 17/12; G02B 5/005; H04N 5/2254; H04N 5/2353

USPC ........................................................ 396/510
See application file for complete search history.

(56) References Cited

FOREIGN PATENT DOCUMENTS

| JP | 5113591 A | 5/1993 |
| JP | 2004294678 A | 10/2004 |
| JP | 2011191490 A | 9/2011 |

*Primary Examiner* — Rochelle-Ann J Blackman
(74) *Attorney, Agent, or Firm* — Rossi, Kimms & McDowell LLP

(57) ABSTRACT

A stop mechanism, including: diaphragms; a reception receiving the diaphragms; a cam rotating the diaphragms to change an aperture diameter; and an interlocking arm interlocking with rotation of the cam and arranged on a radially outer side of the cam to rotate the cam from an outside of the stop mechanism. The diaphragms each include: an arc portion defining the aperture diameter and being received in the reception at maximum aperture; and a light-blocking projection formed on the arc portion to block light outside the aperture diameter. The reception includes cutouts for allowing the light-blocking projection to project outside at the maximum aperture. The interlocking arm is located at a position where the light-blocking projection does not overlap in a circumferential direction, and the light-blocking projection moves into the reception while the interlocking arm moves in the circumferential direction in which the aperture diameter is reduced.

8 Claims, 8 Drawing Sheets

STOP MECHANISM, LENS APPARATUS USING THE SAME, AND IMAGE PICKUP APPARATUS

BACKGROUND OF THE INVENTION

Field of the Invention

The present invention relates to a stop mechanism. More particularly, the present invention relates to a stop mechanism including a configuration for preventing light leakage from portions other than a portion corresponding to a stop effective diameter defined by stop blades, and to a lens apparatus using the same, and an image pickup apparatus.

Description of the Related Art

As stop mechanisms of related-art lens apparatus, there is known a configuration in which stop blades are each enlarged at a radially outer portion so that the stop blades are overlapped with each other in order to prevent light leakage from portions other than a portion corresponding to a stop effective diameter, which is caused when an aperture diameter of the stop mechanism is reduced from a maximum aperture position.

In Japanese Patent Application Laid-Open No. 2011-191490, there is disclosed a state in which light is not leaked from portions other than a portion corresponding to the stop effective diameter due to the overlap of stop blades 2 when the stop aperture diameter is reduced (state of FIG. 2(A)).

Further, in Japanese Patent Application Laid-Open No. 2011-191490, there is disclosed a configuration in which an operation lever 32 integrally formed on an operating member 3 configured to control movement of the stop blades 2 is moved on an outer peripheral side of the stop blades 2. With this, even when the operation lever 32 is projected in a direction of the stop blades 2, the stop blades 2 and the operation lever 32 do not interfere with each other. Consequently, as disclosed in FIG. 9, optical components L2 and L3 can be arranged in a holding frame 13 irrespective of the direction in which the operation lever 32 is projected, thereby increasing the degree of freedom in arrangement of the stop mechanism in the lens apparatus.

Still further, in Japanese Patent Application Laid-Open No. H05-113591, there is disclosed a configuration using a first diaphragm group for defining the stop effective diameter and a second diaphragm group for preventing the light leakage in order to reduce a diameter of the stop mechanism in the lens apparatus.

In Japanese Patent Application Laid-Open No. 2004-294678, there is disclosed a configuration of a stop mechanism in which parts of the stop blades (light leakage light prevention projections) are to be projected outward from a sleeve configured to receive the stop blades at the maximum aperture, thereby preventing the light leakage from portions other than a portion corresponding to the stop effective diameter and reducing the size of the stop mechanism.

However, in the related art disclosed in Japanese Patent Application Laid-Open No. 2011-191490, the operation lever 32 integrally formed on the operating member 3 is moved on the outer peripheral side of the stop blades, thereby increasing the diameter of the stop mechanism including a movable range of the operation lever 32. With this, the lens apparatus accommodating the stop mechanism may be increased in size.

Further, in Japanese Patent Application Laid-Open No. H05-113591, the diameter of the stop mechanism can be reduced, but structure of the stop mechanism is complicated, which may increase costs and difficulty in assembly.

In the configuration of Japanese Patent Application Laid-Open No. 2004-294678, the light leakage prevention projections are projected outward from the sleeve configured to receive the stop blades, and hence the configuration requires an operating portion configured to rotate a cam having cam grooves formed therein while preventing interference with the projected light leakage prevention projections. Thus, the size reduction in an optical axis direction is limited, and arrangement in the lens apparatus is restricted.

SUMMARY OF THE INVENTION

It is therefore an object of the present invention to provide a stop mechanism having a simple configuration with a small size, which has a high degree of freedom in arrangement in a lens apparatus.

According to one embodiment of the present invention, there is provided a stop mechanism for a lens apparatus, including: a plurality of stop blades; a reception member configured to receive the plurality of stop blades; a cam member configured to rotate to change an angle of the plurality of stop blades, to thereby change an aperture diameter of the stop mechanism; and an interlocking arm configured to interlock with rotation of the cam member, in which the plurality of stop blades each include: an arc portion for defining the aperture diameter, which is configured to be received in the reception member at a maximum aperture; and a light-blocking projection portion integrally formed on the arc portion, which is configured to block light outside the aperture diameter defined by the arc portion, in which the reception member includes a plurality of cutouts for allowing the light-blocking projection portion to be projected to an outside of the reception member at the maximum aperture, in which, in a state of the maximum aperture, the interlocking arm is located at a position where the light-blocking projection portion does not overlap the interlocking arm in a circumferential direction of the stop mechanism, and the light-blocking projection portions are projected outward through the plurality of cutouts, and in which the light-blocking projection portions are configured to move toward an inner side of the reception member along with movement of the interlocking arm in the circumferential direction in which the aperture diameter is reduced.

According to the one embodiment of the present invention, it is possible to provide the stop mechanism having a simple configuration with a small size, which has a high degree of freedom in arrangement in the lens apparatus.

Further features of the present invention will become apparent from the following description of exemplary embodiments with reference to the attached drawings.

DESCRIPTION OF THE EMBODIMENTS

Figure 2:
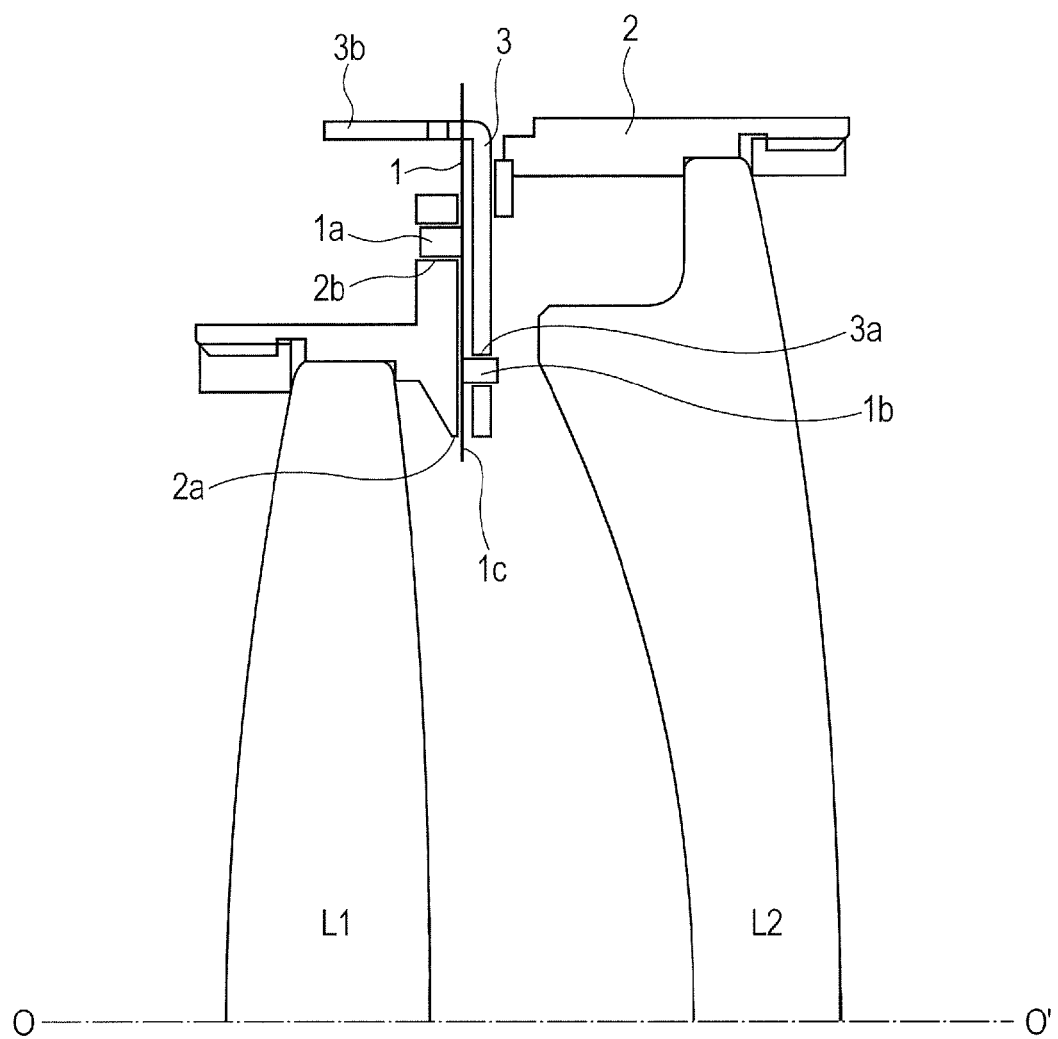
FIG. 2 is an illustration of a part of a cross-section of a stop mechanism according to the first embodiment of the present invention.

Now, exemplary embodiments of the present invention are described in detail referring to the attached drawings. FIG. 2 is an illustration of a part of a cross-section of a stop mechanism according to an embodiment of the present invention.

First Embodiment

Now, referring to FIG. 1 to FIG. 6, a stop mechanism and a lens apparatus including the stop mechanism according to a first embodiment of the present invention are described.

Figure 1:
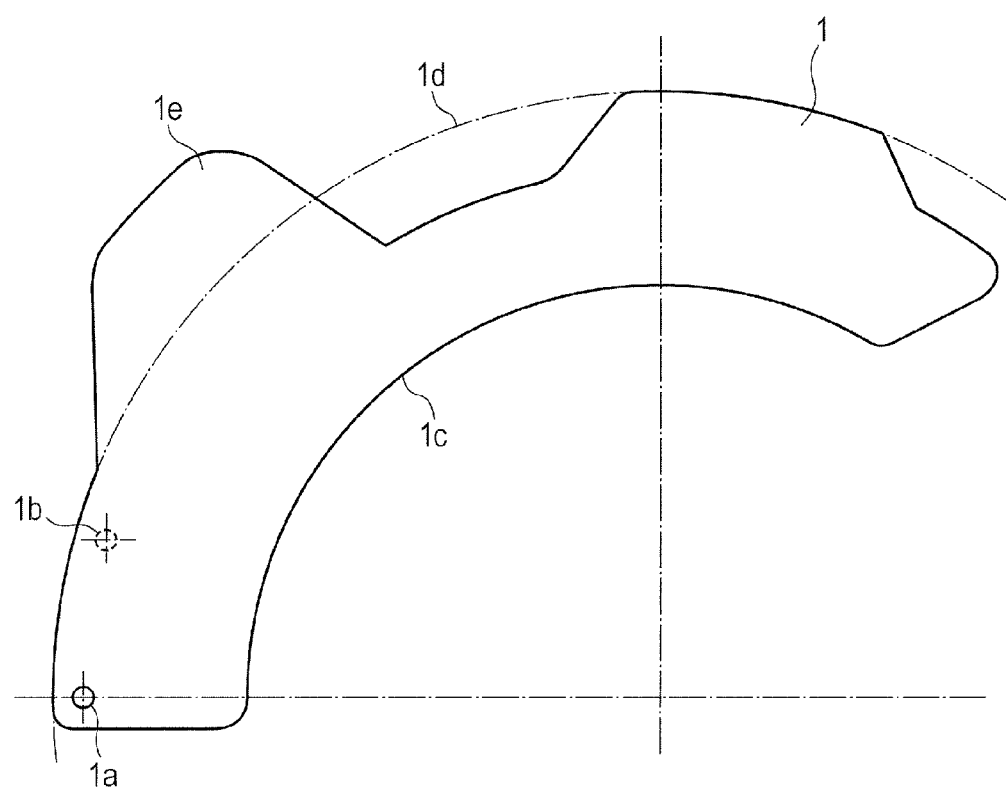
FIG. 1 is an illustration of a shape of a stop blade according to a first embodiment of the present invention.

FIG. 1 is an illustration of a shape of a stop blade according to the first embodiment of the present invention.

A stop blade 1 has a fixing pin 1a and an interlocking pin 1b respectively formed on surfaces of the stop blade 1 to protrude in directions opposite to each other. Further, the shape of the stop blade 1 includes an arc portion and a light-blocking projection portion 1e. In a maximum aperture state, the arc portion is received by a reception member 2 described later, and the light-blocking projection portion 1e is projected radially outward. As illustrated in FIG. 1, the arc portion is formed by a region surrounded by a radially-inner arc 1c defining an aperture diameter of the stop mechanism and a radially-outer arc 1d.

FIG. 2 is an illustration of a part of a cross-section of the stop mechanism according to the first embodiment of the present invention.

A plurality of the stop blades 1 are received between the cylindrical reception member 2 and a cam member 3.

The reception member 2 has a radially-inner opening portion 2a having a center that substantially coincides with the lens optical axis O-O'. In this case, it is desired that the radially-inner opening portion 2a be formed to be concentric with the lens, but the radially-inner opening portion 2a need not necessarily be completely concentric with the lens. The fixing pin 1a is inserted into a corresponding hole 2b formed in the reception member 2, and serves as a rotation center of the stop blade 1. The interlocking pin 1b is inserted into a corresponding cam groove 3a formed in the cam member 3.

When an interlocking arm 3b integrally formed on the cam member 3 is operated to rotate the cam member 3 about the optical axis, the interlocking pin 1b is moved along the cam groove 3a, and a distance from the optical axis to the radially-inner arc 1c of the stop blade 1 is changed, thereby changing the aperture area of the stop mechanism.

Further, in this case, in consideration of arrangement relationships between the stop mechanism and optical components L1 and L2 and between the stop mechanism and an operating portion (not shown) configured to operate the stop from the outside, the interlocking arm 3b is provided to be directed toward the direction of the stop blade 1.

Figure 3:
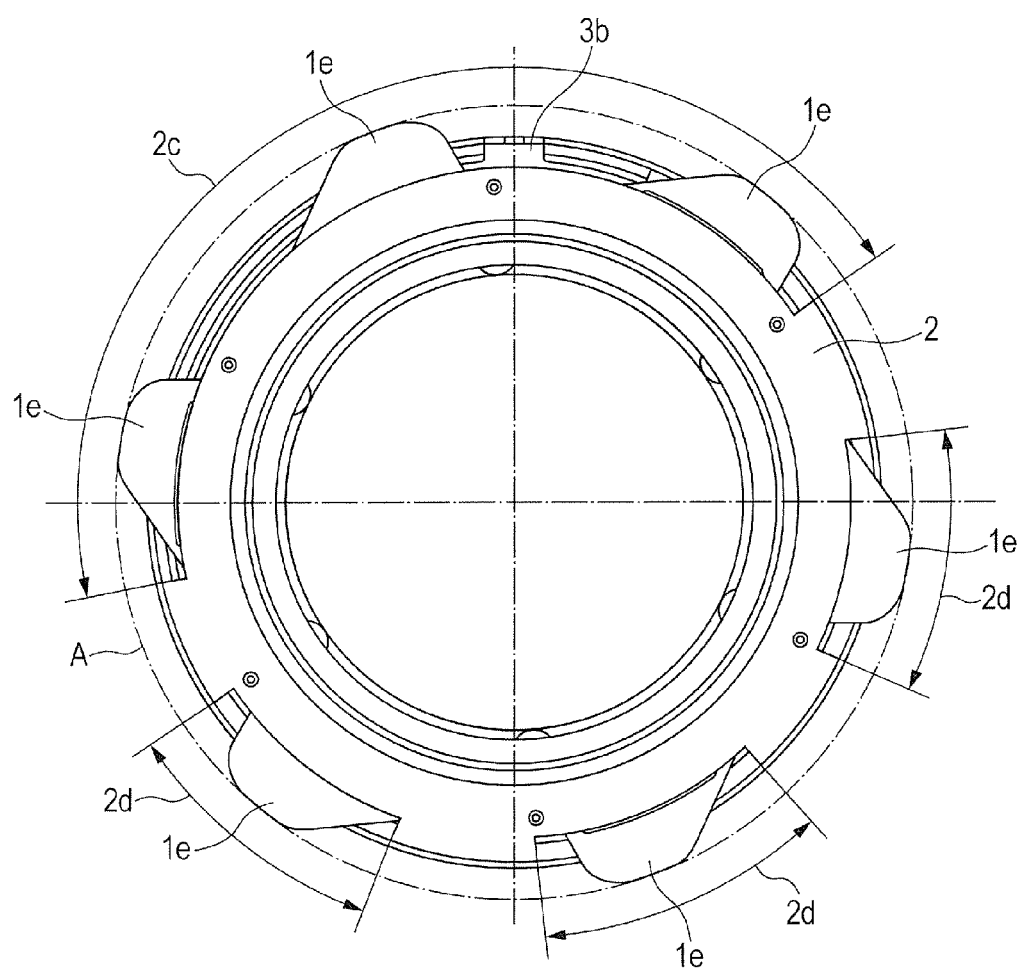
FIG. 3 is a view of the stop mechanism in a maximum aperture state when viewed in a lens optical axis direction according to the first embodiment of the present invention.

FIG. 3 is an illustration of the stop mechanism in the maximum aperture state when viewed in the lens optical axis direction according to the first embodiment of the present invention.

The reception member 2 has a circular outer shape in a cross-section perpendicular to the optical axis. Further, the reception member 2 has an opening portion 2c through which the interlocking arm 3b is operated, and a plurality of cutout portions 2d. The light-blocking projection portions 1e of the stop blades 1 are inserted through the opening portion 2c and the cutout portions 2d, respectively. At least when the stop mechanism is in the maximum aperture state, the light-blocking projection portions 1e project from the opening portion 2c and the cutout portions 2d, respectively. A shape of the light-blocking projection portion 1e is determined so as to prevent light leakage from regions other than a region corresponding to a stop effective diameter when a stop aperture diameter is changed. Further, in the maximum aperture state, the interlocking arm 3b is arranged on a radially inner side with respect to a circle A connecting distal ends of the light-blocking projection portions 1e.

Figure 4:
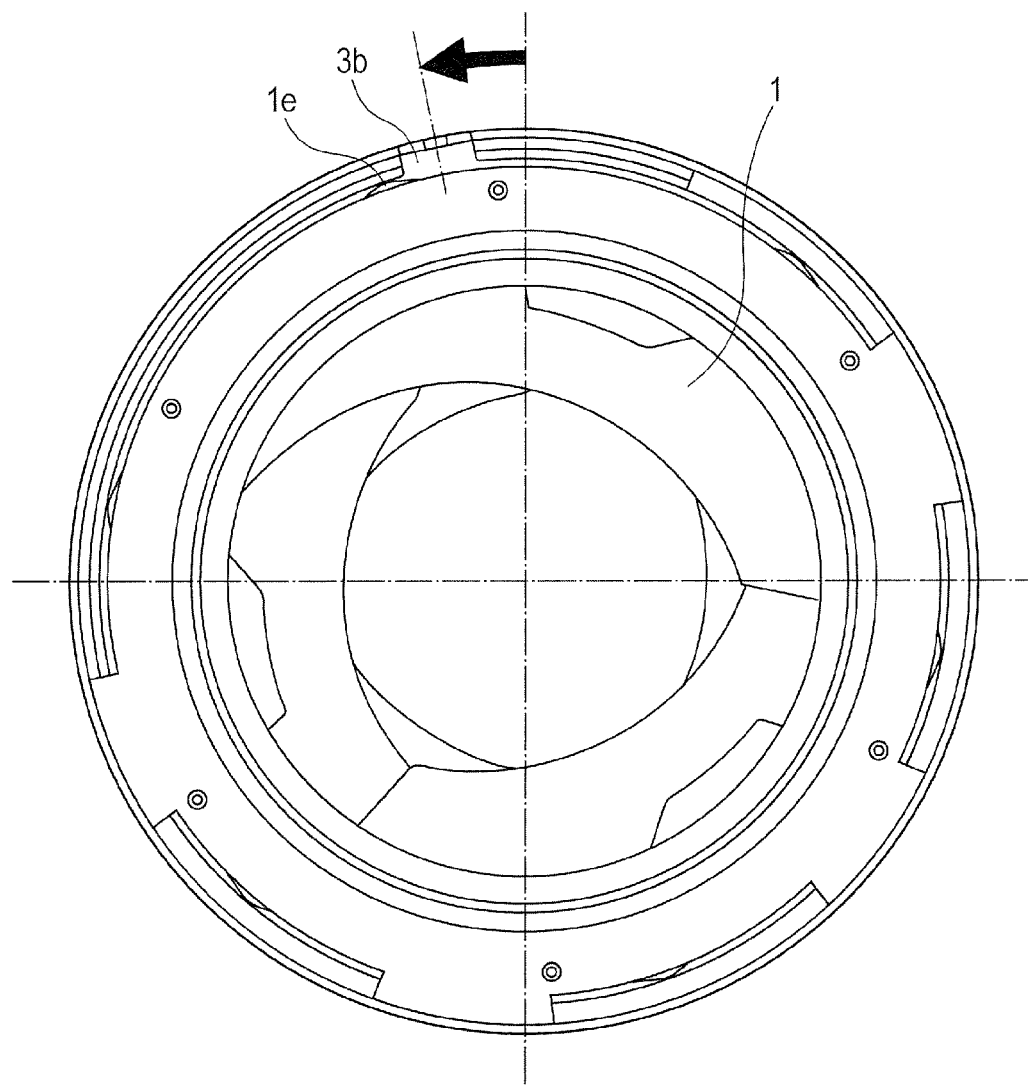
FIG. 4 is a view of the stop mechanism when an interlocking arm of the stop mechanism is rotated up to a phase of a light-blocking projection portion when viewed in the lens optical axis direction according to the first embodiment of the present invention.

When the interlocking arm 3b is rotated from the state of FIG. 3 in which the stop mechanism is in the maximum aperture state to a state of FIG. 4, the interlocking arm 3b reaches a phase in which the light-blocking projection portion 1e of the stop blade 1 adjacent to the interlocking arm 3b in a circumferential direction has been projected. At this time, the stop blades 1 are each inclined at an angle at which the light-blocking projection portion 1e is not held in abutment against the interlocking arm 3b, and the interlocking arm 3b is operated up to a minimum aperture position of FIG. 5 without coming into contact with the light-blocking projection portions 1e.

Figure 5:
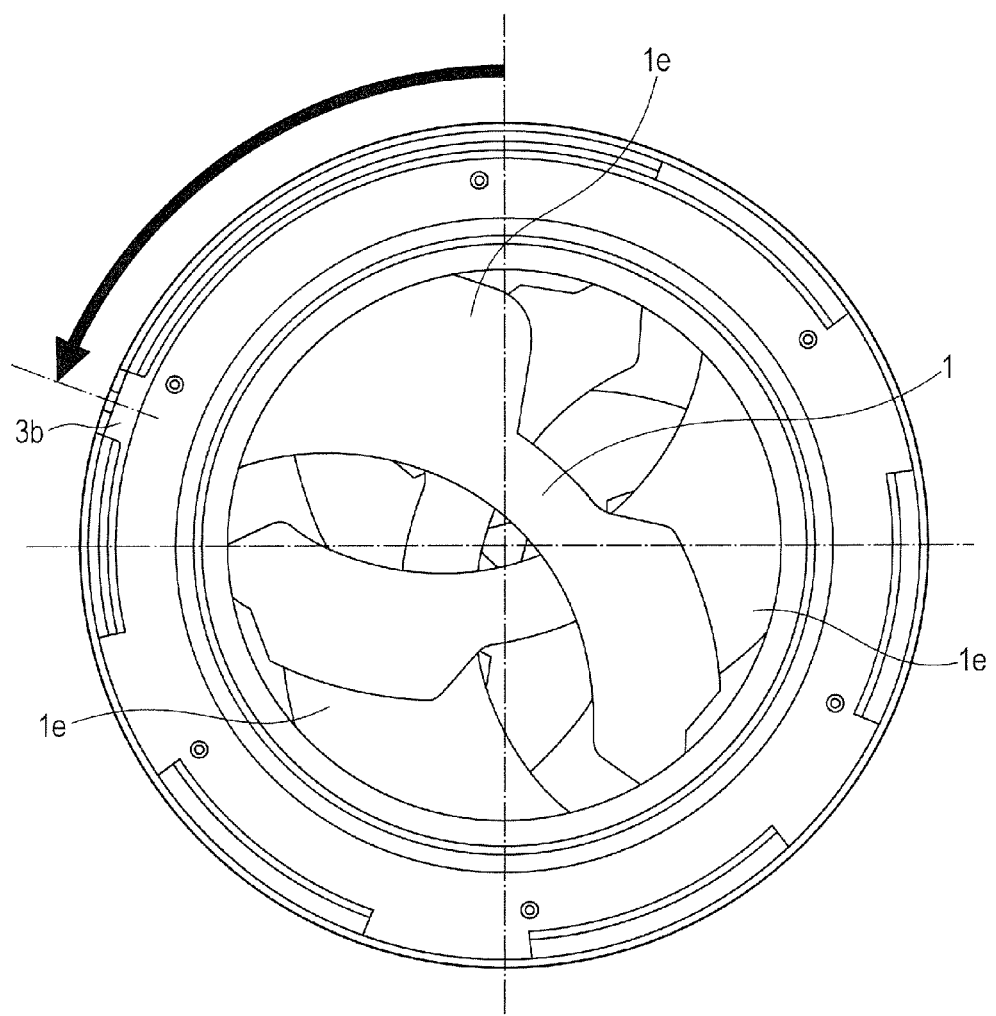
FIG. 5 is a view of the stop mechanism in a minimum aperture state when viewed in the lens optical axis direction according to the first embodiment of the present invention.

In FIG. 5, when the stop mechanism is in the minimum aperture state, the light leaking from portions other than the portion corresponding to the stop effective diameter is blocked due to the overlap of the stop blades 1 each including the light-blocking projection portion 1e.

Figure 6:
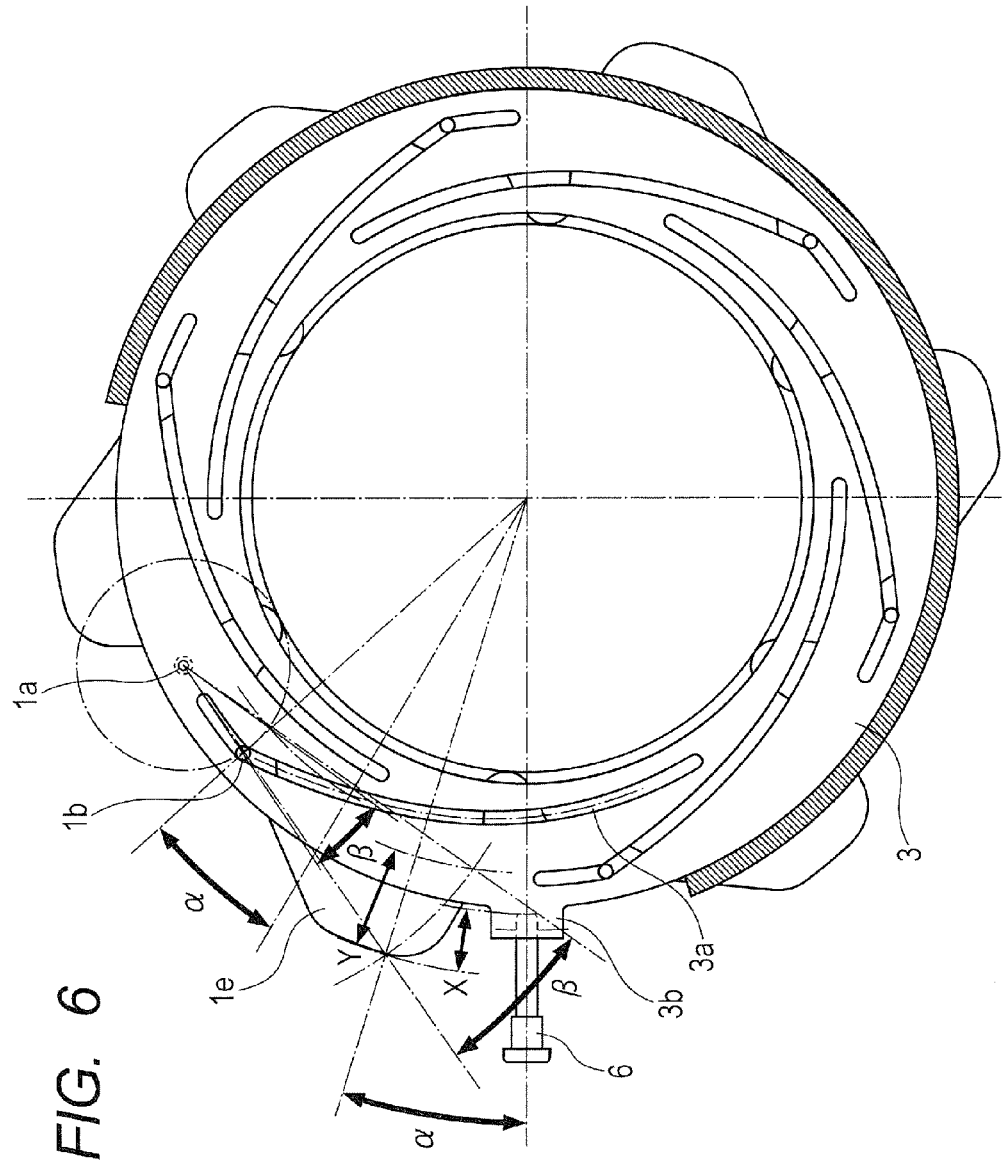
FIG. 6 is a view of the stop mechanism when viewed in the lens optical axis direction, for illustrating a drive state of the stop mechanism according to the first embodiment of the present invention.

A relationship between the light-blocking projection portion 1e and the interlocking arm 3b in a process of narrowing the stop mechanism according to the present invention from the maximum aperture state in a direction toward the minimum aperture position is described in detail referring to FIG. 6. FIG. 6 is a view for illustrating a drive state of the stop mechanism according to the first embodiment of the present invention, and is a view when the cam grooves 3a are viewed from a side opposite to that of FIG. 3, FIG. 4, and FIG. 5 in the optical axis direction.

An angle formed between a drive pin 6 configured to be integrally moved with the interlocking arm 3b and a distal end of the light-blocking projection portion 1e of the stop blade 1 adjacent to the drive pin 6 while the stop mechanism is in the maximum aperture state is defined as α. A difference between a distance from a radially outermost portion of the light-blocking projection portion 1e to the optical axis O and a distance from a distal end of the drive pin 6 to the optical axis O while the stop mechanism is in the maximum aperture state is defined as X. When the cam member 3 is rotated by the angle α through a narrowing operation, the interlocking pin 1b is moved along the cam groove 3a, and the stop blade 1 is rotated about the fixing pin 1a by an angle β toward the optical axis O. At this time, the distal end of the light-blocking projection portion 1e of the stop blade 1 is moved by a distance Y in the optical axis O direction. A locus of the cam groove 3a is formed so that the distance X at this time is smaller than the distance Y, thereby preventing contact between the drive pin 6 configured to be integrally moved with the interlocking arm 3b and the light-blocking projection portion 1e.

As described above, according to the stop mechanism of the present invention, the interlocking arm of the cam member can be arranged within the existence range of the light-blocking projection portions of the stop blades. Thus, the diameter of the stop mechanism can be made small as compared to a case where the interlocking arm is arranged on an outer side with respect to the radially outermost portion of the stop blade.

Further, even when the interlocking arm is arranged on the stop blade side, interference does not occur, thereby being capable of increasing the degree of freedom in positional relationship between the stop mechanism and the optical components and between the stop mechanism and a drive unit configured to drive the stop mechanism.

Second Embodiment

Figure 7:
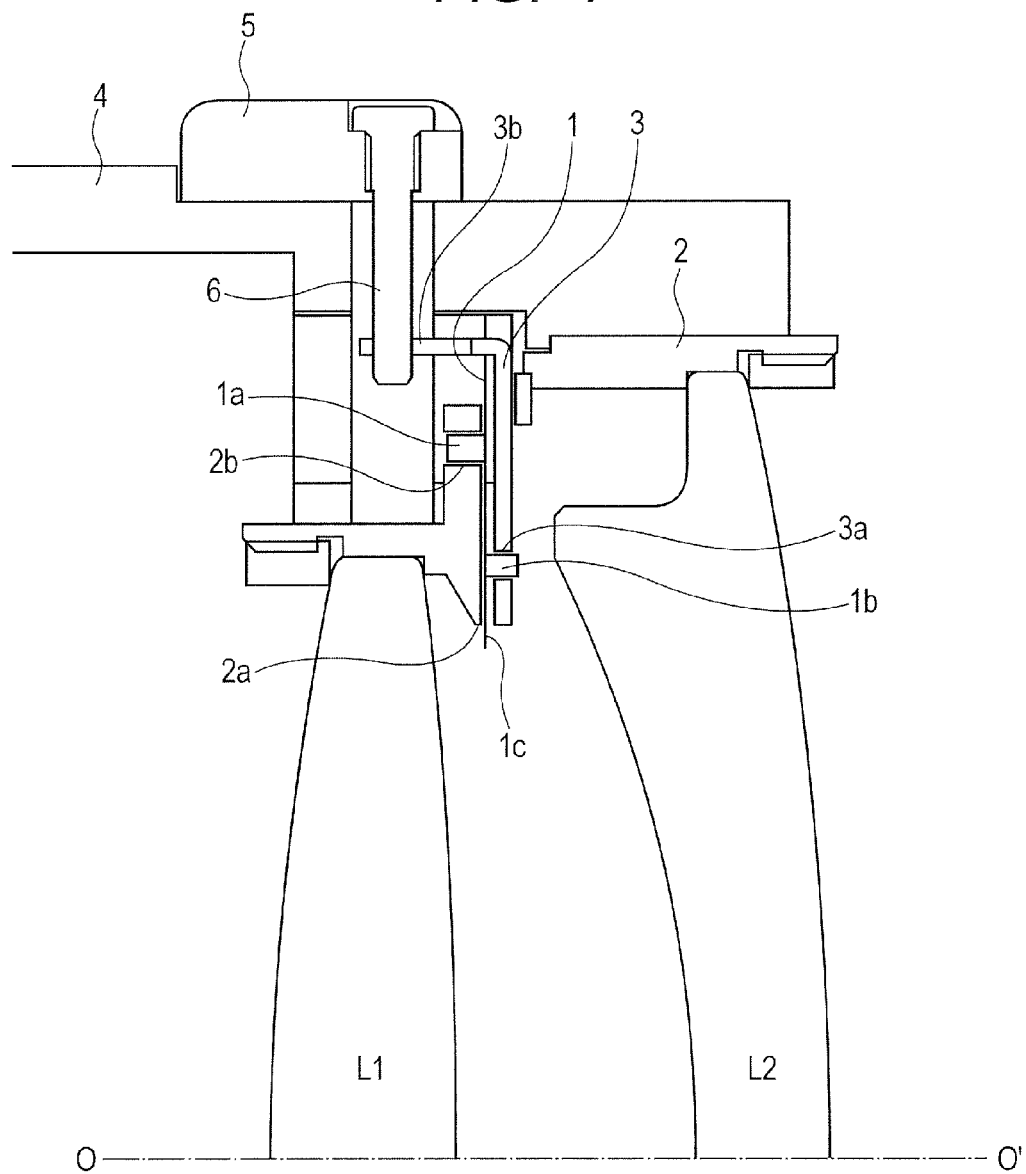
FIG. 7 is a partial cross-sectional view of a lens apparatus including a stop mechanism according to a second embodiment of the present invention.
Figure 8:
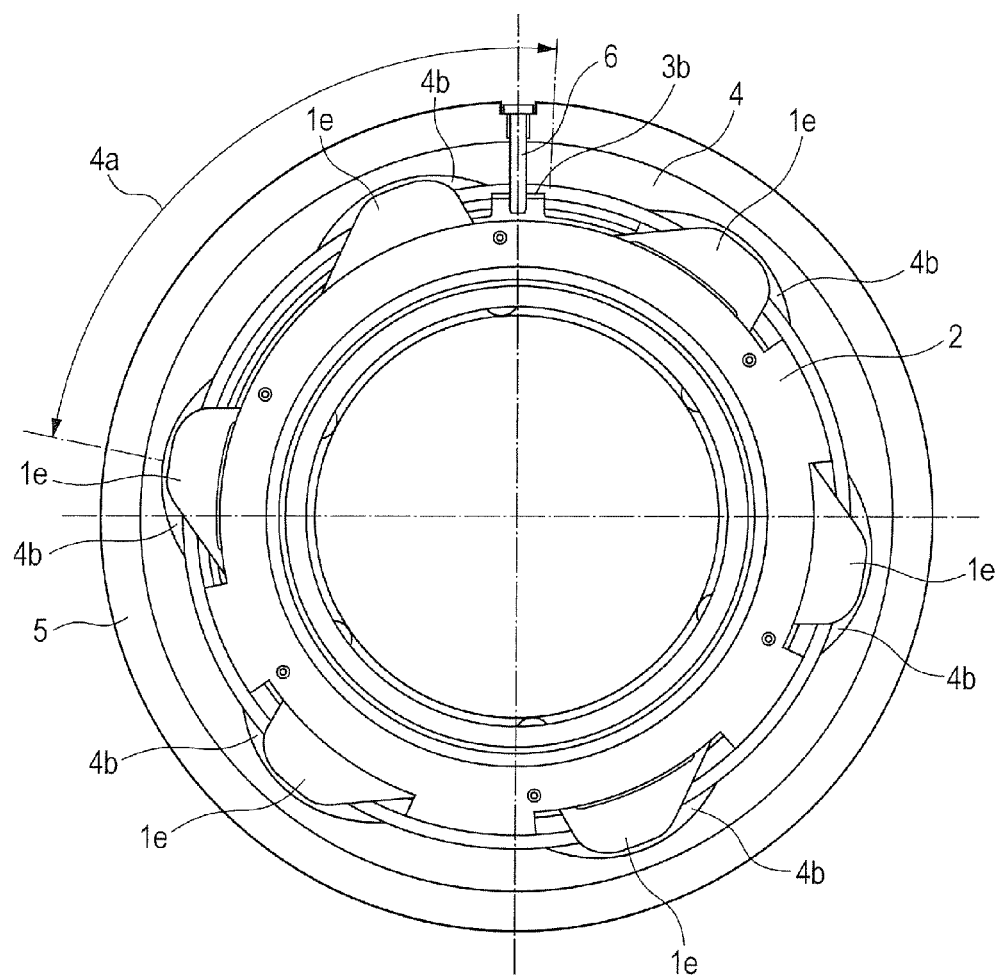
FIG. 8 is a view of an inner part of the lens apparatus including the stop mechanism when viewed in the lens optical axis direction according to the second embodiment of the present invention.

Now, referring to FIG. 7 and FIG. 8, a lens apparatus including a stop mechanism according to a second embodiment of the present invention is described.

FIG. 7 is an illustration of a part of a cross-section of the lens apparatus including the stop mechanism according to the second embodiment of the present invention.

The stop mechanism is arranged in a fixed barrel 4. A drive unit 5 configured to drive the stop mechanism is arranged outside the fixed barrel 4, and the drive pin 6 transmits the movement of the drive unit 5 to the interlocking arm 3b of the cam member 3. A configuration and an operation of the stop mechanism are the same as those of the first embodiment, and description thereof is therefore omitted herein.

FIG. 8 is an illustration of an inner part of the lens apparatus including the stop mechanism when viewed in the lens optical axis direction according to the second embodiment of the present invention.

The fixed barrel 4 has an interlocking slot 4a for allowing the drive pin 6 to be inserted therethrough. The drive pin 6 is operated in the interlocking slot 4a, thereby changing the aperture area of the stop mechanism.

Further, the fixed barrel 4 has relief portions 4b (accommodating portions) as many as the light-blocking projection portions in substantially the same phases with the light-blocking projection portions 1e at the maximum aperture of the stop mechanism. Wall surfaces of the relief portions 4b are formed so as not to interfere with the light-blocking projection portions 1e.

As described above, according to the lens apparatus including the stop mechanism of the present invention, the light-blocking projection portions of the stop blades at the maximum aperture are received in the relief portions formed in the fixed barrel, thereby being capable of reducing the diameter of the fixed barrel as compared to the case where the fixed barrel is formed to have a diameter corresponding to the entire diameter of the stop mechanism.

With this, the diameter of the lens apparatus can be reduced.

Note that, in this embodiment, a shape in which the relief portions do not pass through an outer peripheral portion of the fixed barrel is disclosed. Even when the relief portions pass through the outer peripheral portion, however, the same effect is attained.

Further, in this embodiment, the shape in which the relief portions are formed as many as the light-blocking projection portions is disclosed. Even when the plurality of light-blocking projection portions is received in a single relief portion, however, the same effect is attained.

An image pickup apparatus including the lens apparatus including the stop mechanism according to the present invention and an image pickup element configured to receive light from the lens apparatus is constructed, thereby being capable of providing the stop mechanism having a simple configuration with a small size, which has a high degree of freedom in arrangement in the lens apparatus, and is capable of attaining the effect of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-247896, filed Dec. 8, 2014, which is hereby incorporated by reference herein in its entirety.

What is claimed is:

1. A stop mechanism for a lens apparatus, comprising:
a plurality of stop blades;
a reception member configured to receive the plurality of stop blades;
a cam member configured to rotate to change an angle of the plurality of stop blades, to thereby change an aperture diameter of the stop mechanism; and
an interlocking arm provided in the cam member and configured to interlock with rotation of the cam member,
wherein the plurality of stop blades each comprise:
an arc portion for defining the aperture diameter, which is configured to be received in the reception member at a maximum aperture; and
a light-blocking projection portion integrally formed on the arc portion, which is configured to block light outside the aperture diameter defined by the arc portion,
wherein the reception member comprises a plurality of cutouts for allowing the light-blocking projection portion to be projected to an outside of the reception member at the maximum aperture,
wherein, in a state of the maximum aperture, the interlocking arm is located at a position where the light-blocking projection portion does not overlap the interlocking arm in a circumferential direction of the stop mechanism, and the light-blocking projection portions are projected outward through the plurality of cutouts,
wherein the light-blocking projection portion moves toward an inside of the reception member as the interlocking arm moves in the circumference direction to make the aperture diameter small, and
wherein the interlocking arm rotates about an optical axis of a lens provided in the lens apparatus.

2. The stop mechanism according to claim 1, wherein an outer shape of the reception member comprises a circular shape.

3. The stop mechanism according to claim 1, wherein the interlocking arm configured to interlock with the cam member is configured to rotate along an outer shape of the reception member.

4. The stop mechanism according to claim 1, wherein, when the interlocking arm is rotated to operate the stop mechanism from the state of the maximum aperture in a direction in which the aperture diameter is reduced, the interlocking arm is moved toward a position at which the interlocking arm overlaps adjacent one of the plurality of cutouts while the light-blocking projection portion projected radially outward from the adjacent one of the plurality of cutouts is moved radially inward, to thereby prevent contact between the interlocking arm and the light-blocking projection portion.

5. The stop mechanism according to claim 1, wherein the plurality of stop blades each comprise the light-blocking projection portion on an outer side with respect to the arc portion.

6. The stop mechanism according to claim 1,
wherein the interlocking arm is provided to be directed toward a direction in which the stop blades are stored, and
wherein the interlocking arm is provided at a position outer in a radius direction than a largest diameter of the arc portion and inner in the radius direction than a largest diameter of the light-blocking projection portion.

7. A lens apparatus, comprising:
a stop mechanism for a lens apparatus, comprising:
a plurality of stop blades;
a reception member configured to receive the plurality of stop blades;
a cam member configured to rotate to change an angle of the plurality of stop blades, to thereby change an aperture diameter of the stop mechanism; and
an interlocking arm provided in the cam member and configured to interlock with rotation of the cam member,
wherein the plurality of stop blades each comprise:
an arc portion for defining the aperture diameter, which is configured to be received in the reception member at a maximum aperture; and
a light-blocking projection portion integrally formed on the arc portion, which is configured to block light outside the aperture diameter defined by the arc portion,
wherein the reception member comprises a plurality of cutouts for allowing the light-blocking projection portion to be projected to an outside of the reception member at the maximum aperture,
wherein, in a state of the maximum aperture, the interlocking arm is located at a position where the light-blocking projection portion does not overlap the interlocking arm in a circumferential direction of the stop mechanism, and the light-blocking projection portions are projected outward through the plurality of cutouts,
wherein the light-blocking projection portion moves toward an inside of the reception member as the interlocking arm moves in the circumference direction to make the aperture diameter small, and
wherein the interlocking arm rotates about an optical axis of a lens provided in the lens apparatus, and
a fixed barrel configured to receive the stop mechanism, wherein the fixed barrel comprises an accommodating portion, and
wherein, at least under the state of the maximum aperture, the light-blocking projection portion projected radially outward from the each of the plurality of cutouts of the reception member enters the accommodating portion.

8. An image pickup apparatus, comprising:
a lens apparatus comprising:
a stop mechanism for a lens apparatus, comprising:
a plurality of stop blades;
a reception member configured to receive the plurality of stop blades;
a cam member configured to rotate to change an angle of the plurality of stop blades, to thereby change an aperture diameter of the stop mechanism; and
an interlocking arm provided in the cam member and configured to interlock with rotation of the cam member,
wherein the plurality of stop blades each comprise:
an arc portion for defining the aperture diameter, which is configured to be received in the reception member at a maximum aperture; and
a light-blocking projection portion integrally formed on the arc portion, which is configured to block light outside the aperture diameter defined by the arc portion,
wherein the reception member comprises a plurality of cutouts for allowing the light-blocking projection portion to be projected to an outside of the reception member at the maximum aperture,
wherein, in a state of the maximum aperture, the interlocking arm is located at a position where the light-blocking projection portion does not overlap the interlocking arm in a circumferential direction of the stop mechanism, and the light-blocking projection portions are projected outward through the plurality of cutouts, and
wherein the light-blocking projection portions are configured to move toward an inner side of the reception member along with movement of the interlocking arm in the circumferential direction in which the aperture diameter is reduced,
wherein the light-blocking projection portion moves toward an inside of the reception member as the interlocking arm moves in the circumference direction to make the aperture diameter small, and
wherein the interlocking arm rotates about an optical axis of a lens provided in the lens apparatus,
a fixed barrel configured to receive the stop mechanism, wherein the fixed barrel comprises an accommodating portion, and
wherein, at least under the state of the maximum aperture, the light-blocking projection portion projected radially outward from the each of the plurality of cutouts of the reception member enters the accommodating portion; and
an image pickup element configured to receive light from the lens apparatus.

* * * * *